United States Patent [19]
Belford

[11] Patent Number: 5,406,859
[45] Date of Patent: * Apr. 18, 1995

[54] DEVICE FOR TRANSFERRING POWER BETWEEN LINEAR AND ROTARY MOTION

[76] Inventor: James R. Belford, 184 Lake Shore Dr., Pasadena, Md. 21122

[ * ] Notice: The portion of the term of this patent subsequent to Nov. 5, 2008 has been disclaimed.

[21] Appl. No.: 10,678

[22] Filed: Jan. 28, 1993

Related U.S. Application Data

[60] Continuation-in-part of Ser. No. 850,351, Mar. 9, 1992, which is a continuation-in-part of Ser. No. 722,577, Jun. 27, 1991, Pat. No. 5,094,202, which is a division of Ser. No. 423,562, Oct. 13, 1989, Pat. No. 5,062,394, which is a continuation of Ser. No. 71,103, Jul. 8, 1987, abandoned.

[51] Int. Cl.⁶ ............................................. F16H 19/04
[52] U.S. Cl. ........................................ 74/31; 123/55.5; 123/197.1; 123/197.4
[58] Field of Search .......... 123/56 AC, 56 BC, 197.1, 123/197.3, 197.4; 74/29, 31

[56] References Cited

U.S. PATENT DOCUMENTS

| | | |
|---|---|---|
| 1,123,172 | 12/1914 | Compton . |
| 1,399,666 | 12/1921 | Short . |
| 1,566,692 | 12/1925 | Phipps ................................ 74/31 |
| 1,636,612 | 7/1927 | Noah . |
| 1,687,774 | 10/1928 | Webb . |
| 3,386,805 | 6/1975 | Koderman .............................. 74/52 |
| 4,395,977 | 8/1983 | Pahis ................................ 123/197.1 |
| 4,443,163 | 4/1984 | Gaither ................................ 417/466 |
| 4,658,768 | 4/1987 | Carson ............................... 123/197.1 |
| 4,683,805 | 8/1987 | Fejes ..................................... 92/129 |
| 4,834,632 | 5/1989 | Gatecliff et al. ..................... 417/534 |
| 5,000,077 | 3/1991 | Habicht ................................. 91/361 |
| 5,062,394 | 11/1991 | Belford ............................. 123/197.1 |

Primary Examiner—Noah P. Kamen
Attorney, Agent, or Firm—Keck, Mahin & Cate

[57] ABSTRACT

The invention is a versatile device for transferring power between rotary and reciprocating linear motion comprising a rack assembly with opposed, spaced apart longitudinal portions joined by curved end portions arrayed to form a substantially continuous engaging surface; a stator block for guiding the rack assembly in reciprocating linear movement; a pinion wheel; a guide cam for holding the pinion wheel continuously in engagement with the engaging surface of the rack; and a floating power transfer shaft connected with the pinion wheel and mounted to swing in an arc perpendicular to the linear motion of the rack assembly. Linear reciprocation of the rack assembly through the stator block is coupled with rotary motion of the power transfer shaft and periodic rocking of the shaft as the pinion wheel traverses the engaging surface of the rack. The invention may be used instead of a crankshaft in internal combustion engines and compressors to make such equipment simpler, more powerful, energy efficient, compact, and capable of oil-free operation, and has countless other beneficial applications.

29 Claims, 9 Drawing Sheets

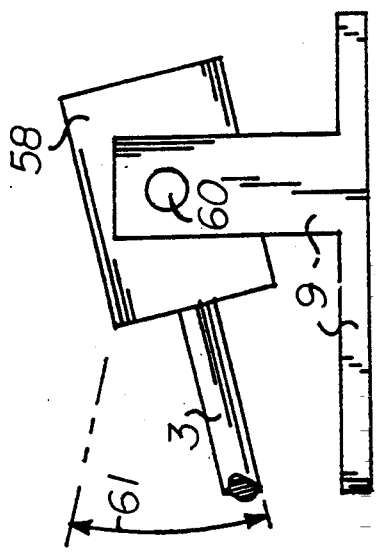
FIG.7
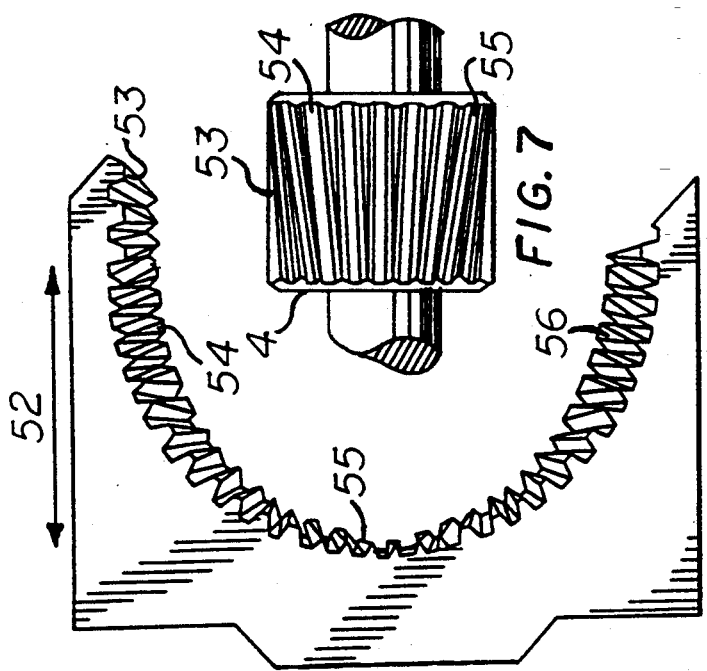
FIG.9
FIG.6
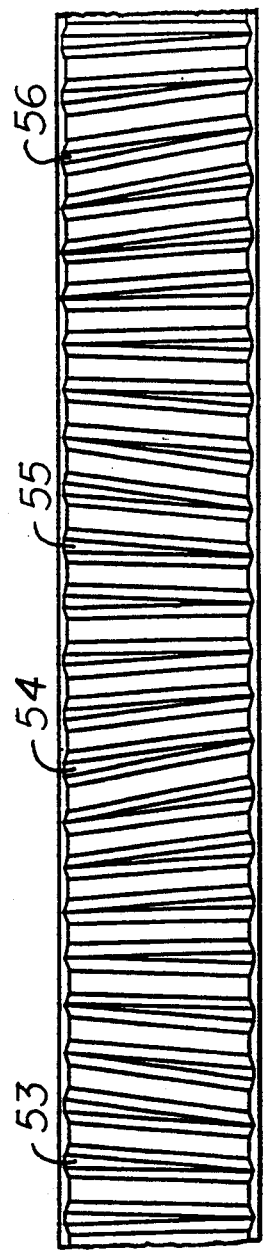
FIG.8

DEVICE FOR TRANSFERRING POWER BETWEEN LINEAR AND ROTARY MOTION

This application is a continuation-in-part of application Ser. No. 07/850,351, filed Mar. 9, 1992, which is a continuation-in-part of application Ser. No. 07/722,577, filed Jun. 27, 1991, now U.S. Pat. No. 5,094,202, which is a division of Ser. No. 07/423,562, filed Oct. 13, 1989, now U.S. Pat. No. 5,062,394, which is a continuation of Ser. No. 071,103, filed Jul. 8, 1987, now abandoned.

BACKGROUND OF THE INVENTION

This invention relates to a versatile device for transferring power between rotary and linear reciprocating motion, and offers a wide range of energy efficiency and environmental benefits in engines, compressors, pumps, and other applications. In the prior art, power transfer is generally effected by a crank shaft, for example in internal combustion engines, where the crank shaft converts linear reciprocating motion of pistons to rotary motion of a drive shaft. In compressors, crank shafts are used to convert rotary motion into linear reciprocating motion. Crank shafts are hampered by many factors, including changing crank angulation, the size of crank shaft necessary to accommodate larger stroke lengths, and the increased power required for such larger stroke lengths.

In internal combustion engines with crank shafts, as the power is applied to the piston, it is transmitted toward the center of the crank shaft and no torque is developed. As the crank moves out of line with the piston, the torque transfer begins to increase until it reaches a maximum at the 90 degree point, when the piston is already half way down the cylinder. The crank continues its movement and the torque decreases back to zero at the bottom of the stroke. In compressors and piston pumps using a crank shaft, to increase the volume, the crank or the piston surface must be enlarged, which requires a larger drive motor.

Prior art devices cannot deliver essentially steady power transfer throughout the piston stroke. A number of patents represent attempts to replace the crank shaft with other types of mechanisms. For example, Compton U.S. Pat. No. 1,123,172, issued in December 1914, Short U.S. Pat. No. 1,399,666, issued December 1921, and Noah U.S. Pat. No. 1,636,612, issued July 1927, each involves a shaft that rotates around a fixed axis. Other patents also represent efforts to solve the problems in designing a versatile device capable of efficiently transferring power between reciprocating and linear motion, for example, Webb U.S. Pat. No. 1,687,744 issued October 1928; Koderman U.S. Pat. No. 3,886,805 issued July 1975; Pahis U.S. Pat. No. 4,395,977, issued August 1983; Gaither U.S. Pat. No. 4,443,163, issued April 1984; and White U.S. Pat. No. 4,608,951 issued September 1986. The devices disclosed in these patents are impractical, have too many moving parts, are inefficient, or are overly complex. They do not provide a viable alternative to crank shafts, and are not useful in the wide variety of other applications where it is necessary to transfer power between linear reciprocation and rotary motion.

SUMMARY OF THE INVENTION

The invention is a device for transferring power between rotary and reciprocating linear motion comprising (a) a rack assembly comprising opposed, spaced apart longitudinal portions joined by curved end portions arrayed to form a substantially continuous engaging surface; (b) stator block means for guiding the rack assembly in reciprocating linear movement; (c) a pinion wheel; (d) a guide cam for holding the pinion wheel continuously in engagement with the engaging surface of the rack; and (e) a floating power transfer shaft connected with the pinion and mounted to swing in an arc perpendicular to the linear motion of the rack assembly. Linear reciprocation of the rack assembly through the stator block means is coupled with rotary motion of the floating shaft and periodic rocking of the shaft as the pinion wheel traverses the engaging surface of the rack.

The device of the invention can transfer power from a reciprocating source to a rotary output, as with an internal combustion engine. It can also transfer power from a rotary motion input to a reciprocating output, as for example with compressors. In both applications, the invention is advantageous in that it has few moving parts, is powerful, efficient, lightweight, compact, and capable of oil-free operation.

The longitudinal portions of the enclosed rack are preferably parallel to each other. The pinion wheel and the engaging surface of the rack are preferably geared. The longitudinal and end portions of the rack can have first, second, and third helical gear sections of differing tooth configurations positioned in a repetitive ordered array on the surface of the rack, the first section having teeth oriented to extend at a positive angle with respect to the direction of linear motion, the second section having teeth oriented to extend perpendicular to the direction of linear motion, and the third section having teeth oriented to extend at a negative angle with respect to the direction of linear motion. In this embodiment, the pinion wheel is a gear whose surface has first, second, and third sections complementing the first, second, and third sections of the rack.

The guide cam preferably comprises a bar cam with external surfaces paralleling the internal surfaces of the rack, two end channels, and, connected to the pinion gear, roller bushing means for traversing the external bar cam surfaces and channels to hold the pinion in continuous engagement with the enclosed rack. Other guide cams include a guide track, a short bar, a forked lever, and a collar.

The floating power transfer shaft may be coupled to a drive shaft that rotates around a fixed axis. In preferred embodiments, the coupling means is a constant velocity joint, and the angle described by the arc of the floating power transfer shaft is greater than about 20 degrees. The device may also include a flywheel and coupling means for transferring the rotary motion of the power transfer shaft to the flywheel. The device has almost universal application where power is transferred between rotary linear motion.

BRIEF DESCRIPTION OF THE DRAWINGS

FIG. 6 is a front view of the end of the toothed rack, the other end of the toothed rack being similarly configured;

FIG. 7 shows a pinion gear with teeth configured to mesh with the rack shown in FIGS. 6 and 8.

FIG. 8 shows tooth profiles along the straight sections of the rack;

FIG. 9 is a side view showing a pivoting power transfer shaft;

DETAILED DESCRIPTION OF THE INVENTION

Figure 1:
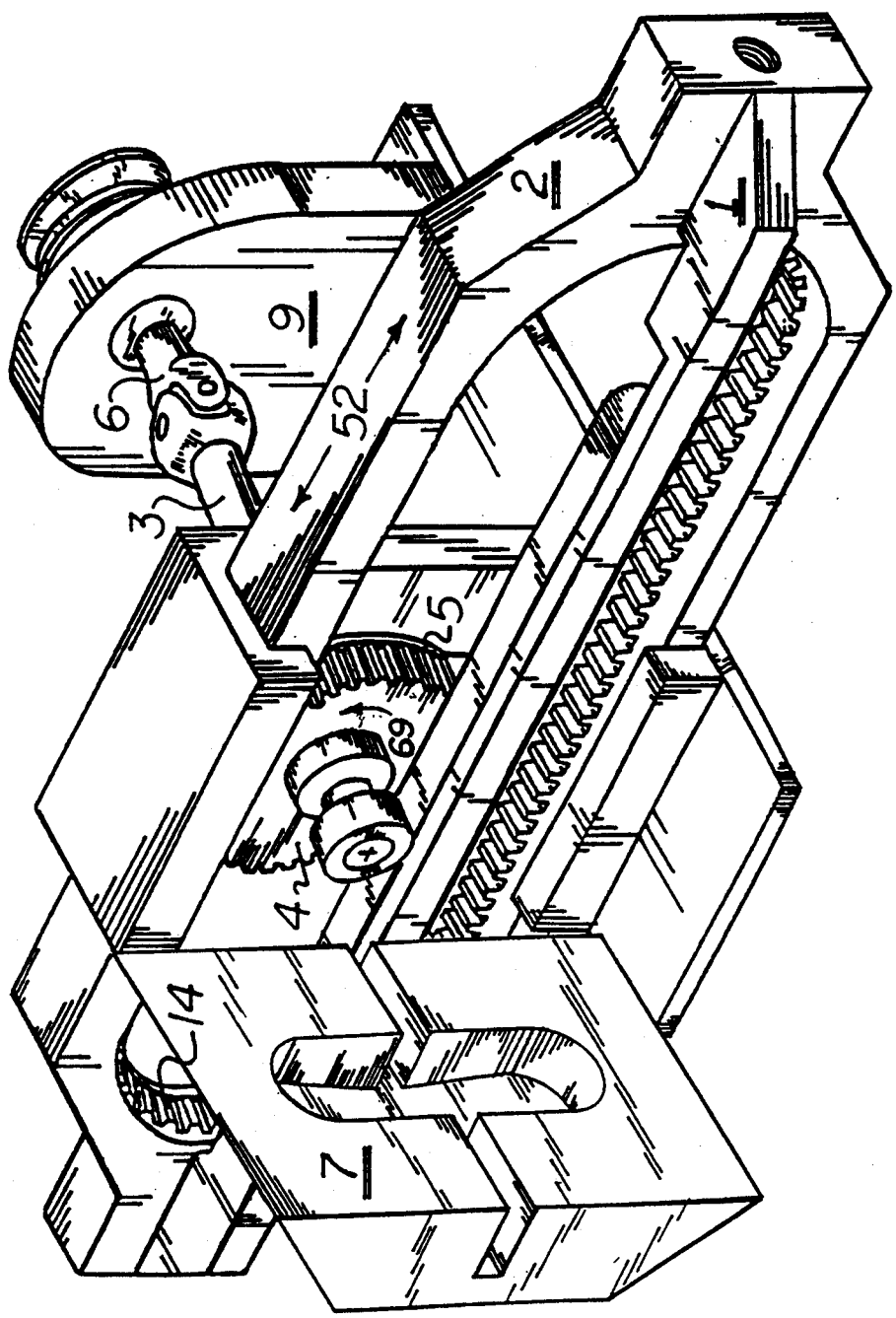
FIG. 1 is an isometric view of an embodiment of the invention employing a bar cam.
Figure 2:
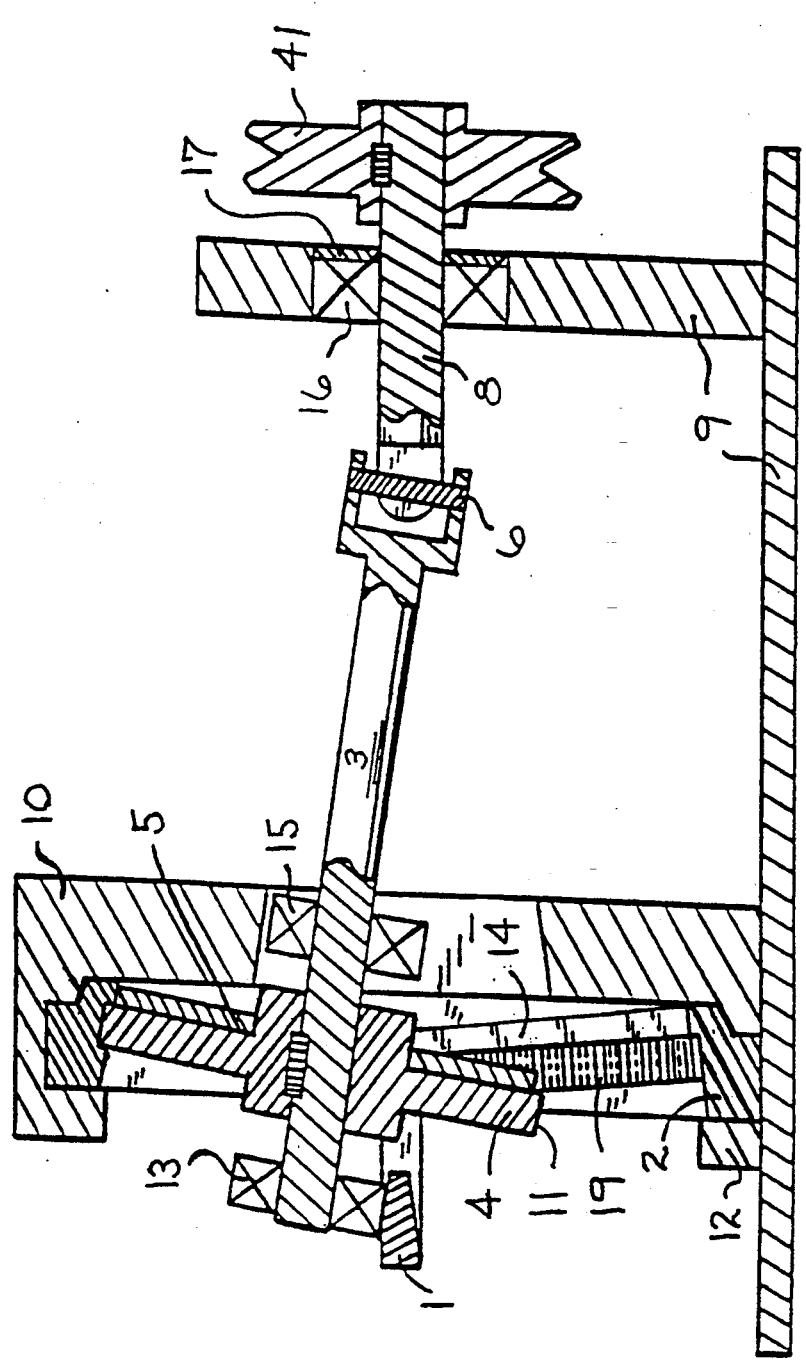
FIG. 2 is a side view of the device shown in FIG. 1.

The operation of the power transfer device may best be understood in reference to figures showing various examples of its use and application. In FIGS. 1 and 2, a power transfer device according to the invention is shown without power delivery or receiving components with which it may typically be associated. Guide cam 1 and rack assembly 2 are affixed to each other and move as one unit in a linear direction indicated by 52. The guide cam 1, in this drawing shown as a bar cam, guides the cam follower 13 on floating shaft 3 which transfers power to or from the rack assembly. Placed on the floating shaft within the rack is a pinion wheel or gear 4 and the load receiver 5 which rides on its counterpart, the rack load transmitter 14, so as to keep the gears in mesh without binding, while the floating shaft rotates as indicated by 69. At the other end of the shaft away from the pinion is a constant velocity joint 6 which allows the power transfer shaft to oscillate in an arc perpendicular to the direction of travel of the rack assembly. At the front end of floating shaft 3 and in front of pinion 4 and adding support to the bar cam is cam stabilizer 7. At the back side of the constant velocity joint 6 is shaft 8 maintained by units block 9. Between the C.V. joint 6 and the pinion load receiver 5 is a horizontal stabilizer 10 to keep the arc of the floating shaft square to the rack. At the outer edges of the pinion 4 lies the contact surface 11 of the pinion which rides on its counterpart, track 19, shown as a toothed track. The rack is held true and stable while sliding by a stator block comprising rack guiders 12, which may be covered by a friction reducing material such as Teflon, or Vespel-ST, a self-lubricating plastic composite produced by DuPont.

In operation, cam follower 13 guides the end of the floating shaft 3 along the profile of bar cam 1 contained in rack 2 on the back side of the rack to make the movement of pinion 4 and load receiver 5 match their counterparts, track face 19 and load transmitter 14. On floating shaft 3 and within horizontal stabilizer 10 is horizontal stabilizer bushing 15. On fixed power shaft 8 within block 9 is power shaft bushing 16 and its seal 17. At the front end of shaft 3 is cam follower bushing 13, which rides on the faces 18 of the bar cam 1. The rack has a toothed engaging surface 19 that matches the teeth of pinion 4. The teeth in the rack are tilted in the straight portions and wide enough in the curved end regions to accommodate the arcing path of the floating power transfer shaft. At the distal end of shaft number 8 is drive accessory 41, such as a pulley, gear, or other conventional device.

It should be noted that the rack assembly may include a toothed or untoothed engaging surface, depending on the particular application. Likewise, the pinion may be either a toothed gear or a friction wheel. In embodiments where noise or vibration is a factor, the untoothed configuration is preferable. The engaging surface is shown internal to the rack, but in some applications it may be preferable to locate the engaging surface on the exterior of the rack. The point of contact between the longitudinal portion of the engaging surface and the pinion wheel is important to transferring power from linear motion to rotary motion or vice versa, and any appropriate means for effecting that transfer may be employed.

Figure 3:
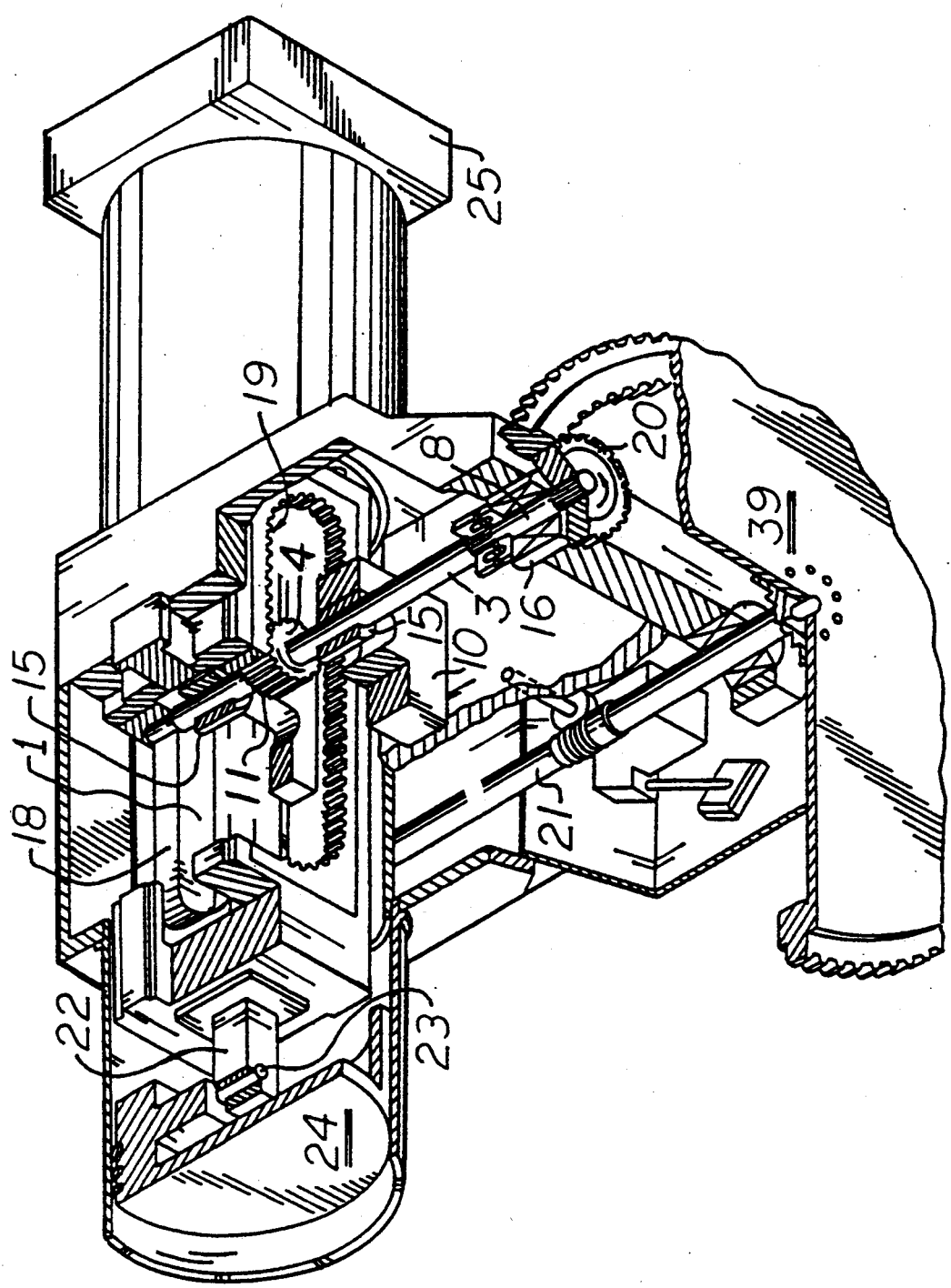
FIG. 3 is a perspective view, partially cut away, of an engine employing the invention.

FIG. 3 shows a piston engine utilizing the power transfer device of the invention instead of a crankshaft. Similar structures have the same reference numbers as in previous figures. The engagement means 1 and its guiding surface 18 are mounted separately from the track and its associated component. At the back end of shaft 3 is constant velocity joint 6, which may be of the type used in front wheel drive vehicles. Power shaft 8 is also connected to joint 6, and is attached to power shaft pinion 20. Parallel to shaft 8 is auxiliary shaft 21. At the back end of axillary shaft 21 is flywheel 39. Connecting posts 22 are connected to the ends of the rack assembly 2, and are joined by wrist pins 23 to conventional internal combustion engine piston 24, to provide for linear reciprocating motion. Beyond the face of the piston 24 is the head assembly 25.

Figure 4:
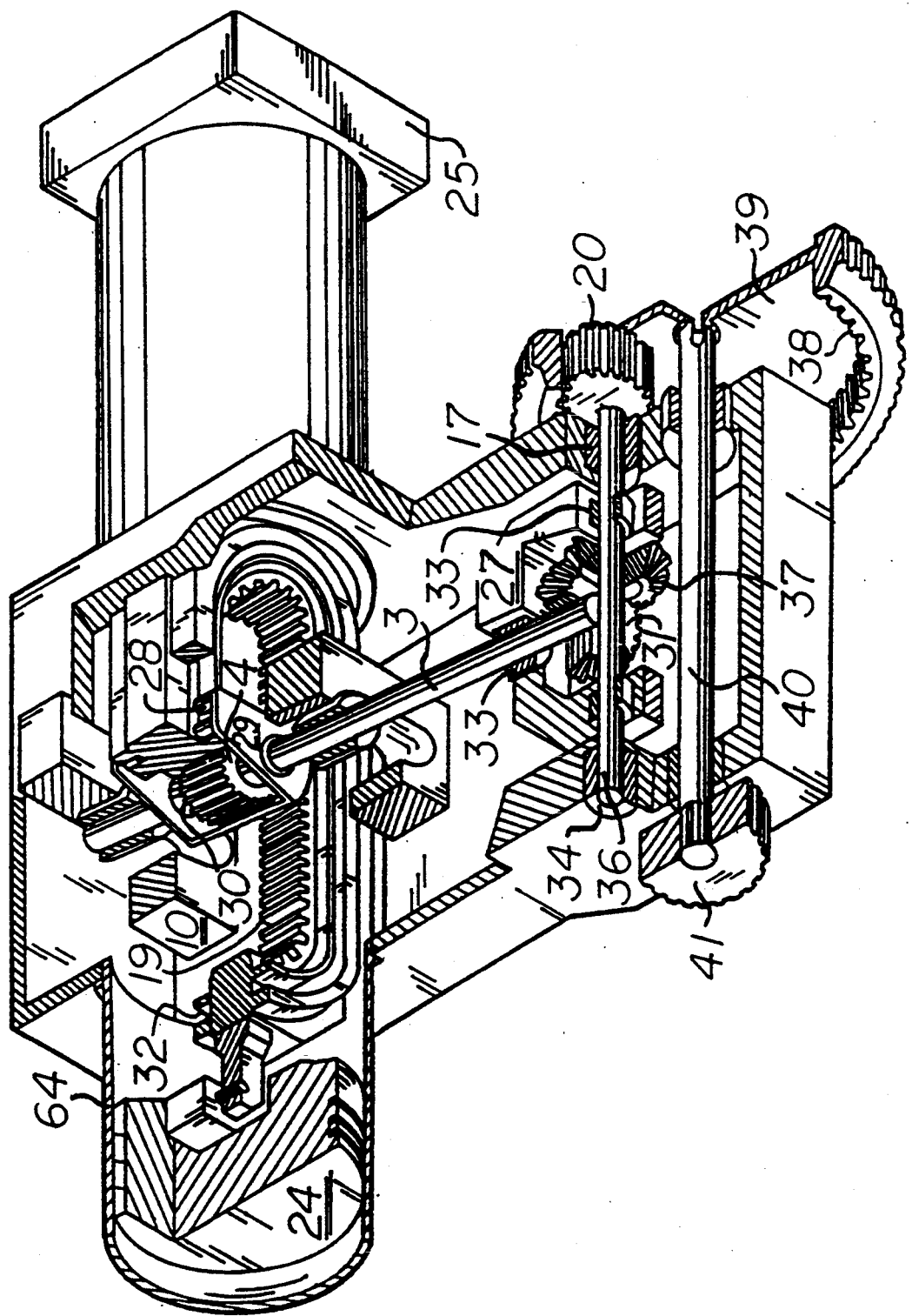
FIG. 4 is a perspective view, partially cut away, of a second engine embodiment.

FIG. 4 depicts an embodiment where the guide cam is a track that keeps the floating shaft pinion engaged with the rack assembly. Otherwise, similar structures have reference numbers used previously. Floating shaft 3 begins in thrust post 10 where it is supported by bearings 33. On shaft 3 in front of and behind pinion 4 are interlock guide rollers 28, secured together by interlock guide assembly 29 and its bearing 30. On the sides of the rack assembly 2, profiling the gear face 19, is the interlock guide assembly roller track 32, which guides floating shaft 3, and keeps pinion 4 meshed with gear face 19. Power is transferred along shaft 3 back to thrust angulating housing assembly 27, passing through housing bearing 33. It should be noted that in general, bushings and bearings are interchangeable in most applications. However, a bushing is favored in applications where an impact load is being transmitted, such as with part 10.

At the back end of floating shaft 3 in housing 27 is conical gear 31. Positioned perpendicular to the conical gear is a drive power transfer shaft 36 journaled in bushing 34 mounted in the housing. Shaft 36 receives the thrust angulating gear 37 and meshes with conical gear 31. Shaft 36 continues through housing 27, bearing 34, bushing 33, and seal 17. Housing bushing 33 is placed where floating shaft 3 and transfer shaft 36 enter housing 27. Shaft 36 is attached to drive gear 20 which meshes with the internal toothed track 38 of flywheel 39. This is attached to output drive shaft 40 and accessory device 41.

Figure 5:
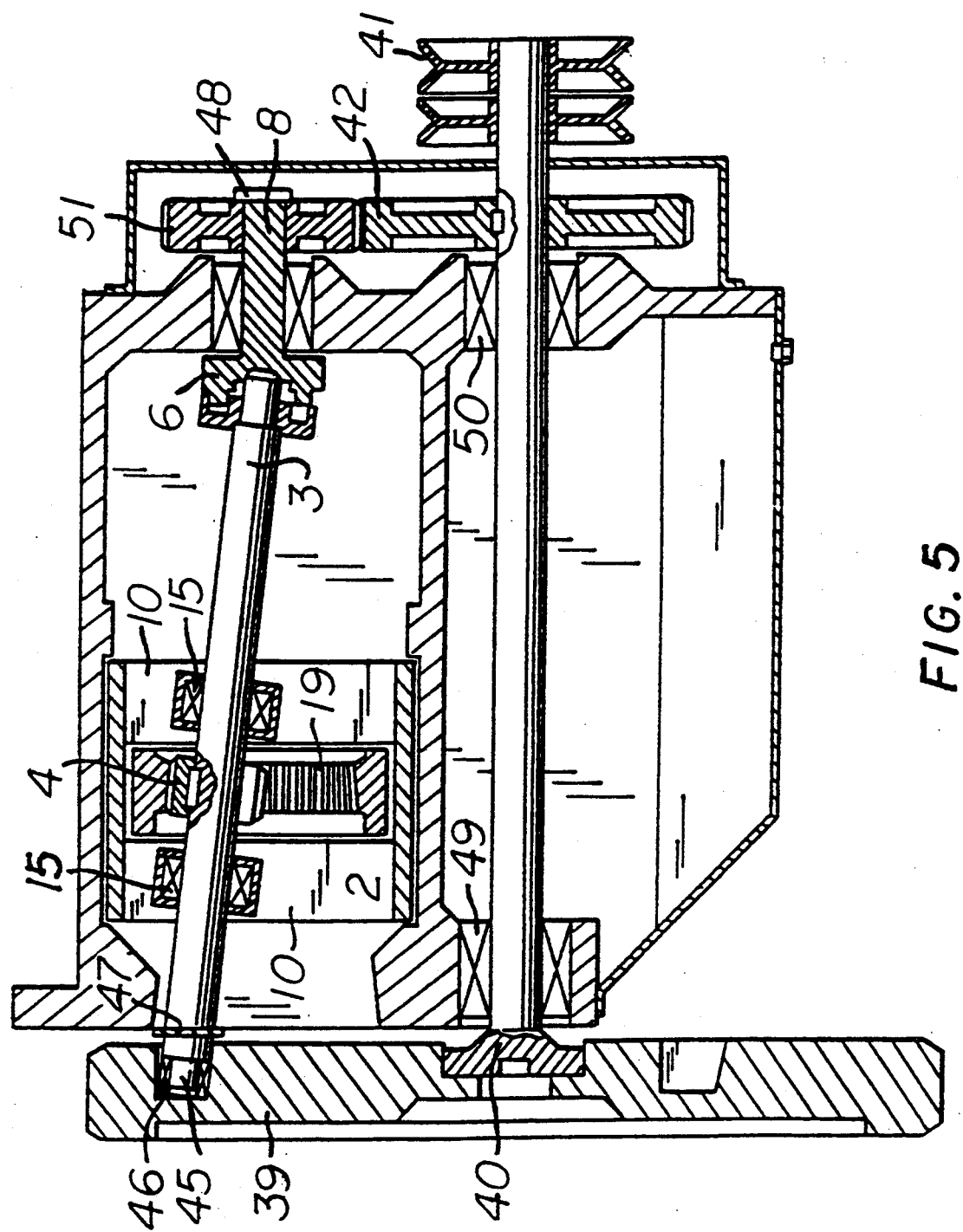
FIG. 5 is a side elevation view showing a different engine embodiment.

FIG. 5 employs a grooved flywheel as a guide cam, another alternative to the bar cam. Near the front end of auxiliary shaft 40 is power transfer gear 42. The floating shaft 3 and the constant velocity joint 6 function as in the previous embodiments. Floating shaft 3 is restrained at one end by a constant velocity joint 6 and has at its free end cam follower 45 received in offset groove track 46 disposed in a flywheel 39. Seal 47 is located near the flywheel 39. Track 46 maintains the proper path of the floating shaft. The flywheel is mounted on a shaft 40, which is journaled in the engine housing by bearings 49 and 50. The shaft 40 has a gear 42 at the end thereof, which meshes with power transfer gear 51. Gear 51 is journaled on shaft 8 of the constant velocity joint 6, and is held by gear retainer lock 48. Auxiliary shaft 40 is maintained by auxiliary shaft bushing and seal 49 and bushing 50. Pulleys 41 are also mounted on the end of the shaft 40 to take power therefrom, or to deliver power, depending on the application for the power transfer device.

Flywheel 39 is configured to give the flywheel a constant velocity as the oscillating shaft 3 is driven by the linearly reciprocating rack 2. In operation, as with the previous examples, power is transmitted between linear reciprocation of the rack assembly and rotary motion of floating shaft 3 and associated power shafts.

As an alternative to the tilted tooth configuration of the engaging surface shown in FIG. 2, a special gearing configuration may allow the engaging surface to be level, as shown in FIGS. 6, 7, and 8. Reciprocating movement of the rack is shown as 52. The teeth are shaped to accommodate linear oscillation of the rack in the direction of arrows 52. As is seen in FIG. 6, the teeth 53 at the top of the rack are shaped differently from the teeth 55 at the end of the rack and the teeth 56 at the bottom of the rack. The configuration accommodates arcing oscillation of the pinion gear on the floating shaft in a plane perpendicular to the plane including the rack, and avoids excess strain on the teeth due to the angled engagement.

As shown in FIGS. 6-8, the wedge-shaped gear teeth are shown with a repetitive pattern, which repeats over the straight section of the rack. Progressing along the longitudinal portion, for example, in FIG. 8, the positive tooth angle 53 at one end of the rack changes as shown at 54, and becomes neutral at 55. At the other end, the tooth angle becomes negative 56. The corresponding pinion gear is shown as 4 in FIG. 7. Gear 4 has an array of teeth, with 53-55 showing, which are designed to mesh with the array of teeth of the rack shown in FIGS. 6 and 8. Consequently, pinion gear 4 does not bind on the teeth of the rack.

FIG. 9 is a device that does not require a constant velocity joint as in FIGS. 1 and 2. Item 58 is a pivoting electrical power output (motor) or input (generator) device. Shaft 3 functions as in the previous figures. It may be the armature shaft of any electric motor, for example, and is mounted on part of the block assembly 9. The movement is allowed by use of pivoting pins 60 and the arc line 61 is essentially the same as the arc of floating shaft 3. This configuration is also appropriate for hydraulic or pneumatic applications where a rotary pump for fluids is used instead of an armature. It should be noted that the fluid that may be pumped in such a configuration could be either liquid or gas.

Figure 10:
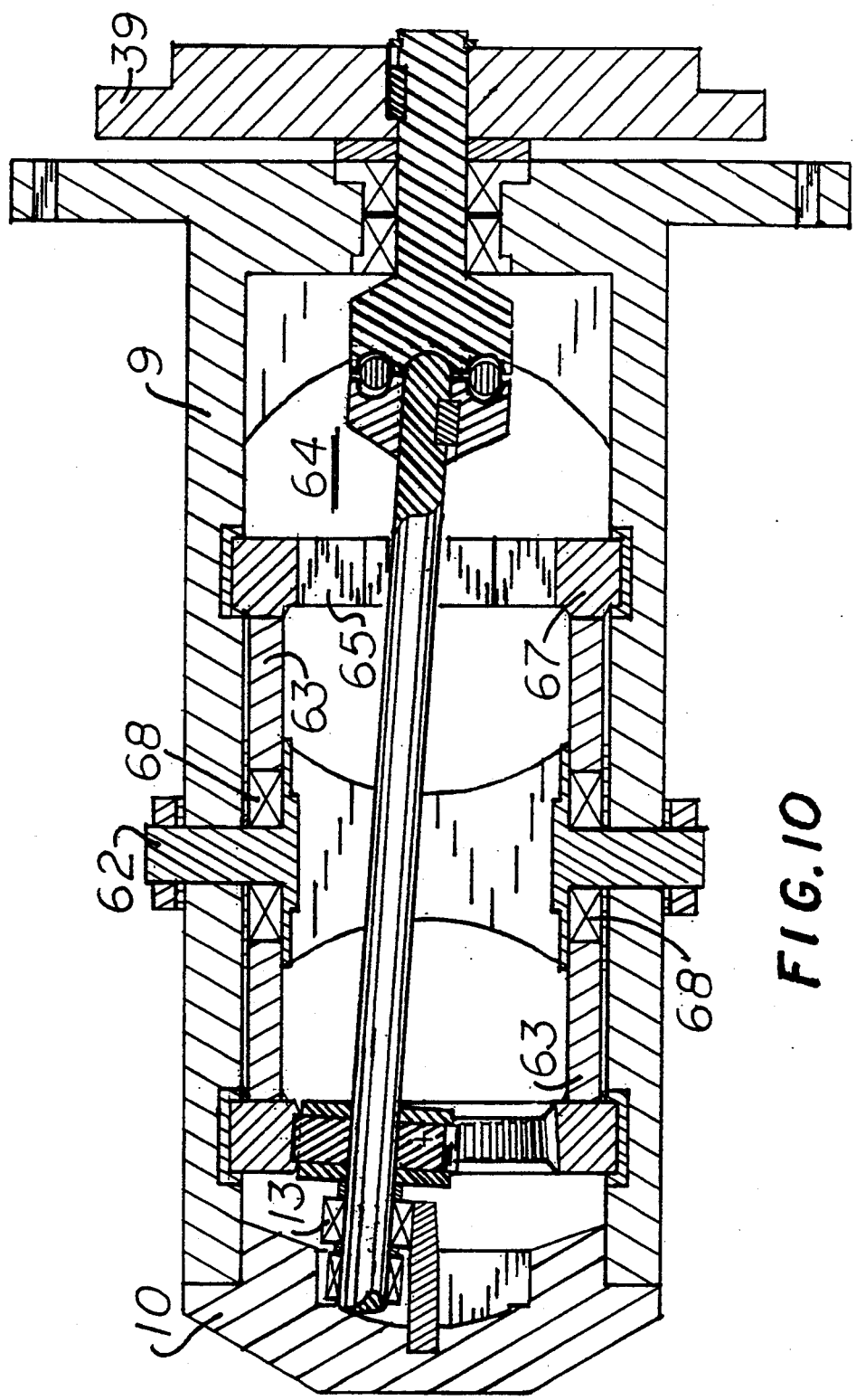
FIG. 10 is a cross-section of an application ganging multiple rack assemblies for multi-piston use.
Figure 11:
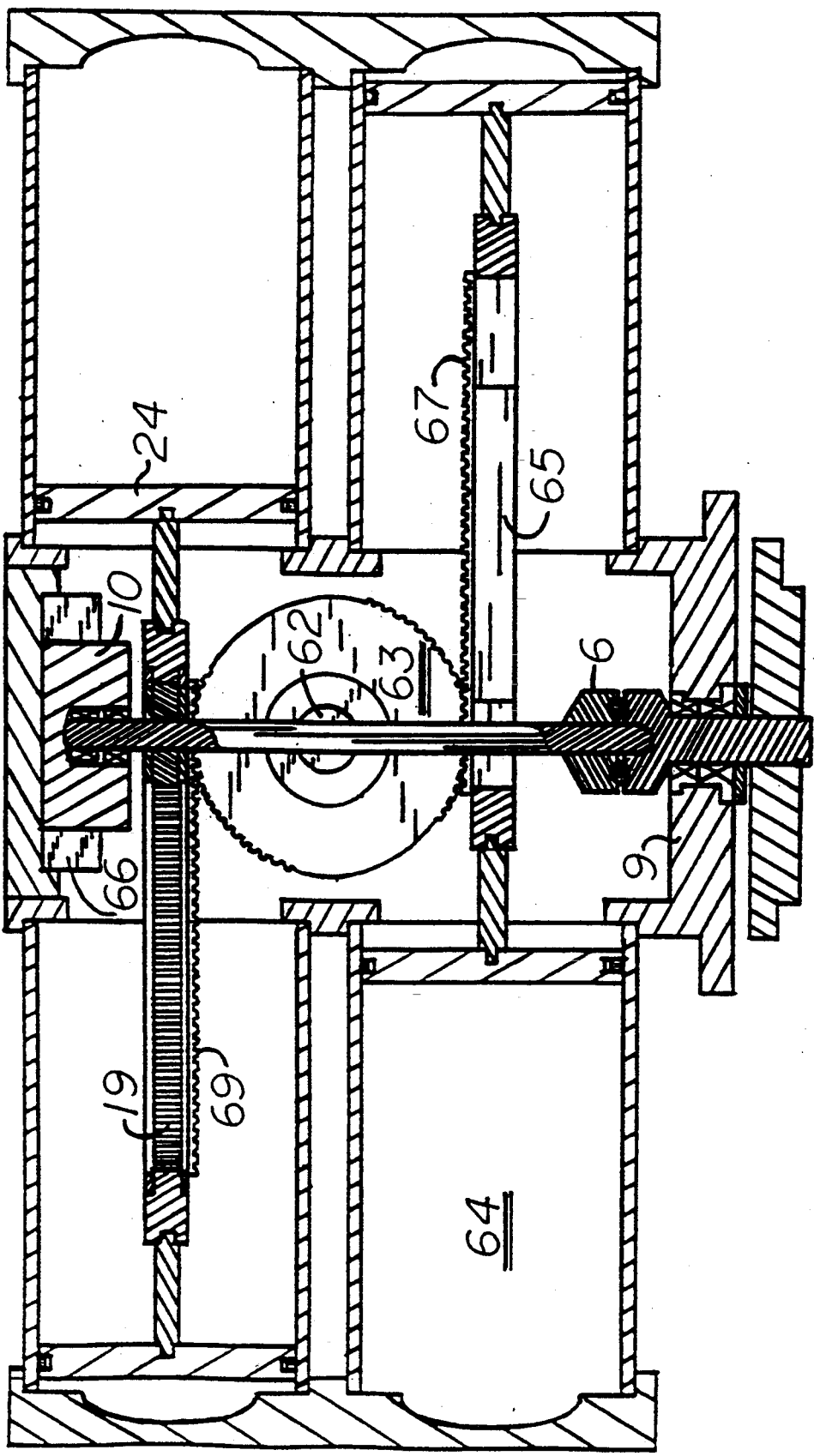
FIG. 11 is a top view of the device shown in FIG. 10, taken along line 11—11.

FIGS. 10 and 11 show an arrangement for multiple pairs of cylinders. Center balance pin 62 is in the middle and centered between the cylinders 64. Balance idler gear 63 keeps front rack 2 and back rack 65 in time with each other. The pistons travel in the cylinder area 64. Back rack 65 is shown without teeth to allow the floating shaft 3 to pass through without interfering with its movement. Power is delivered from rack 65 through gear 63 to rack 2 and thereby to the floating shaft. A short guide cam 66 is shown that works the same as bar cam 1 but allows the racks 2 to run at higher speeds by decreasing the moving mass. The short guide cam can also be used in other embodiments. Rack balance teeth 67 are engaged with the teeth of the balance gear 63 to keep the racks in time. Bearing 68 is in the balance gear. Additional idlers may be used in the same manner, or cylinder arrangements may be stacked to provide additional power (or volumes in the case of a compressor) as needed. If a third pair of cylinders were added to the device shown in FIG. 11 between the back rack and the flywheel, that too could be driven by a pinion engaged with that rack because the rack movement would be in the same direction as the front rack. This approach can be used to gang as many cylinders as desired. An additional advantage is that this device will operate so long as one pair of cylinders is operating; the other set can be disengaged. Alternatively, the arrangement of FIG. 3 could be adapted to use with multiple floating shaft arrangements, all geared to the same flywheel.

As disclosed here, the power transfer device of the invention may employ any appropriate guide cam to keep the floating shaft engaged with the rack assembly, including means that are not typically identified as a cam. Additional examples are in FIGS. 12-15.

Figure 12:
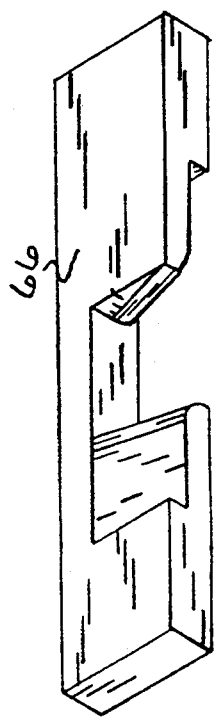
FIG. 12 shows a short guide cam useful as an engagement means.

FIG. 12 shows a short guide cam 66 that moves perpendicular to floating shaft 3. The end of the shaft is held up by the left end of cam 66 as the pinion traverses the straight part of the rack as the rack moves from right to left. As the rack reaches the end, the pinion begins to follow the curved portion of the track. The short cam begins to move, allowing the shaft to lower and pass through the center. A piston on the left of the rack would be at top dead center at that point. As the bar cam continues to move to the left, the rack begins to move to the right. The shaft is then locked under the right end of the short cam and will stay there for the remainder of the straight part of the cycle, at which point it will reverse itself.

Figure 13:
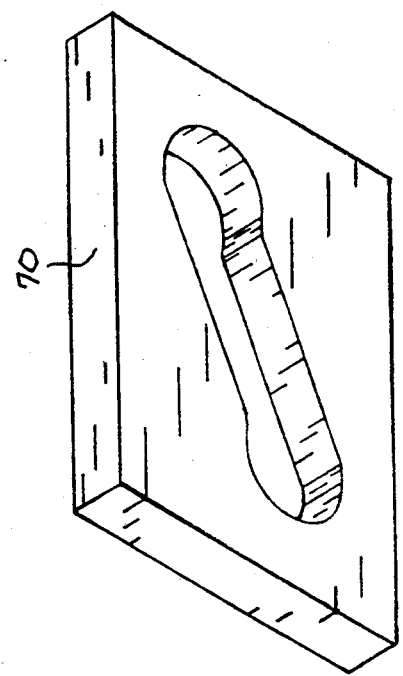
FIG. 13 shows a grooved guide cam.

FIG. 13 is a grooved guide cam that moves perpendicular to floating shaft 3 with a diagonal grove cut from bottom to top, and slides side to side as necessary to accommodate the oscillation of the end of the floating shaft. The end of the floating shaft rides in the grove. The block is not affixed to the rack and must therefore be moved mechanically, by solenoids, or by other means necessary to provide proper timing.

Figure 14:
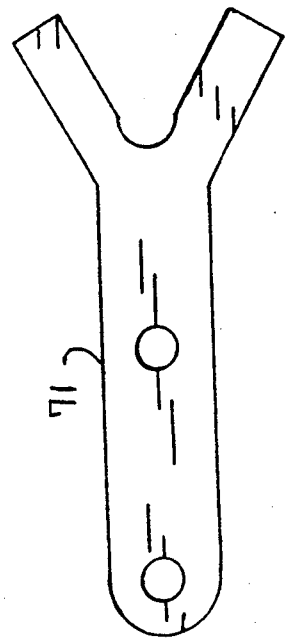
FIG. 14 shows a forked guide cam.

FIG. 14 shows a forked guide cam that employs lever action to move the floating shaft as needed. It includes a central pivot and a driving point at the opposite end from the fork. The floating shaft traverses the interior of the fork. Otherwise, the operation of this guide cam is similar to FIG. 12, and may require mechanical or other means necessary to provide proper timing.

Figure 15:
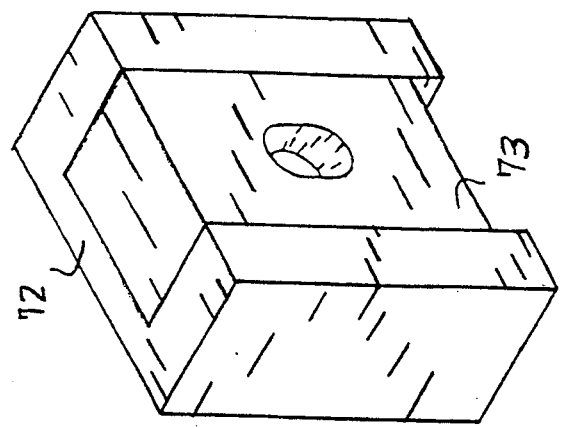
FIG. 15 is a moving block guide cam.

FIG. 15 shows a short vertical moving block that controls the movement of the end of the floating shaft. Housing 72 guides block cam 73 up and down. The block cam is moved by mechanical or other means necessary to provide the proper timing.

Figure 16:
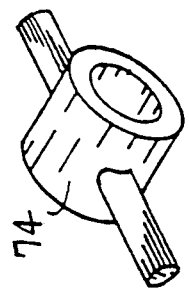
FIG. 16 is a pivoting collar guide cam.

FIG. 16 is a collar cam that can be placed around the floating shaft and can be raised and lowered as needed to guide the floating shaft and force it into proper engagement. The collar cam has the ability to pivot as needed to follow the angle of the floating shaft. It may be used as an alternative or in combination with the other engagement means. Other appropriate means to move the floating shaft in the required manner include mechanical, electric, pneumatic, and hydraulic means.

In sum, the rack assembly transmits or receives the power developed or applied by the pistons or other reciprocating component to or from the floating shaft by means of gearing or friction. The stator block functions as a horizontal stabilizer that insures proper movement and alignment of the components, and may include friction reducing components or be externally lubricated. The floating shaft transmits the rotary load to or receives the rotary load from the rack assembly.

Proper pinion engagement is insured by the bar cam or other guide means. The floating shaft is rotated by the linear movement of the reciprocating movement of the rack assembly or is driven by rotation to move the rack in a reciprocating manner. The power transfers between the floating shaft and the fixed shaft by means of a coupler or other means necessary to allow the needed movement.

The external guiding surface of the guide cam, or other engaging surface, and the corresponding stabilizer bushing, may be smooth as shown in the figures, or toothed as desired.

The angle described by the arc of the floating power transfer shaft may vary between a fraction of a degree in an application with a long floating shaft and a narrow rack assembly, up to, in theory, almost 180 degrees with a short shaft and a broad rack assembly. Generally speaking, it has been determined that most applications have an arc angle of between about 15 degrees and about 45 degrees, although other angles are also consistent with the invention. In applications with an arc of more than about 20 degrees, it will generally be advantageous to use a constant velocity joint; with less of an arc, a universal joint will generally suffice.

As can be readily understood, the configuration of the rack, engaging surface, guide cam, and pinion may be selected as desired to achieve the benefits of the invention and to meet desired standards of composition, length, height, speed of operation, input source, output device, and other operational parameters. So long as the elements of the rack, stator block, pinion wheel, guide cam, and floating shaft are present and function as described, many such devices are within the scope of the invention.

Embodiments of the invention transfer power between rotary and reciprocating motion by use of a guided floating shaft assembly, which applies direct force on a toothed gear or friction wheel during expansion and all other cycles of devices such as combustion and non-combustion engines, pumps, compressors, and motors. The device of the invention can replace a conventional crank shaft which is hampered by changing crank angulation, and can be used in novel applications as well. The power transfer effectuated in devices employing the invention remains substantially constant over the majority of the power curve, and does not fluctuate significantly as in a device using a crank shaft.

The device of the invention increases power output of engines as compared to conventional crank shaft engines, which experience power loss due to the change of the angular crank shaft position. It also increases revolutions (RPM) at the floating shaft assembly for each cycle of the device.

The invention allows the flywheel of an internal combustion engine or external compressor or the like to be placed either perpendicular to or in line with the body of the device, and otherwise reduces the number of moving parts per power output.

Further advantages of the invention are that it reduces engine or mechanism size by allowing the rack assembly to enter the cylinder wall area on a piston up stroke; reduces weight; reduces component wear by reducing engine or mechanism speed; reduces exhaust noise levels by lowering exhaust gas pressure through increasing the reciprocating stroke length; and increases the engine or mechanism's power output by use of a fixed gear ratio determined by the rack assembly and pinion wheel configuration.

In compressors, the power transfer device of the invention increases the volume per stroke by increasing the length of the straight part of an oval gear assembly used with the invention; allows the piston travel to be increased to any length; and allows the drive engine or mechanism size to remain the same no matter how far the piston travels.

A feature of applicant's claimed invention is that it eliminates the structures such as the piston rod which connects pistons of conventional engines to the crankshaft. Typically, a piston rod is pivoted to both the piston and the crankshaft so that it assumes an angular relationship with respect to the axial direction of the reciprocating piston during a cycle. Accommodation of this angular relationship rather drastically reduces the power that a piston is able to deliver to the crankshaft. Moreover, in novel applications described in this disclosure, the invention may be used in any device in which it is important to transfer power between linear and rotary motion.

Environmental benefits of the invention include the potential of eliminating crankcase oil in combustion engines, and the pollution and spills that are associated with millions of oil changes each year. The engine may run virtually pollution-free due to the lack of petroleum fuels and oils that are required in conventional engines, if in addition to the power transfer device, self-lubricating piston rings and cylinder sleeves composed of Vespel-ST from DuPont or ceramic materials which require no lubrication. Such devices may run on methanol, ethanol, natural gas, or other clean-burning fuels.

In compressors, released air will be oil-free without the need for filters and other devices to keep crankcase oil from entering the environment. Moreover, the lighter weight, smaller size, and greater efficiency of devices based on the invention will contribute greatly to increased energy efficiency in numerous everyday and specialized applications.

The advantages of the invention may be understood by considering the power input, transfer, and total output delivered by a hypothetical piston engine with a three inch stroke and maximum head pressure of 300 pounds per square inch, as depicted in Table 1. The pressure curve for a cylinder in the engine rises quickly upon ignition to 300 p.s.i, then falls off over the remainder of the downward stroke. This pressure curve is the power input available. In a typical engine with crankshaft, the power transfer rises from 0% of the available power at the top of the stroke, and does not attain 100% of the available power until the midpoint of the stroke, when the pressure curve has already descended dramatically. The power transfer in such an engine then continues to descend to 0% at the bottom of the stroke. The units of torque of output delivered by such an engine are represented by the head pressure times the percentage of available power transferred. As shown in Table 1, the efficiency is very low for a crankshaft.

TABLE 1

HYPOTHETICAL 3" STROKE PISTON ENGINE

| PISTON STROKE (IN.) | HEAD PRESSURE (P.S.I.) | CRANK SHAFT POWER TRANSFER (%) | CRANK SHAFT TORQUE (UNITS) | BAR CAM POWER TRANSFER (%) | BAR CAM TORQUE (UNITS) | ADVANTAGE OF BAR CAM |
|---|---|---|---|---|---|---|
| Top Dead Center | 300 | 0 | 0 | 0 | 0 | 0 |
| 0.5 in. | 275 | 35 | 96.25 | 100 | 275 | 178.75 |
| 1.0 in. | 225 | 70 | 157.5 | 100 | 225 | 67.5 |
| 1.5 in. | 175 | 100 | 175 | 100 | 175 | 0 |
| 2.0 in. | 125 | 70 | 87.5 | 100 | 125 | 37.5 |
| 2.5 in. | 75 | 35 | 26.25 | 100 | 75 | 48.75 |
| Bottom Dead Center | 25 | 0 | 0 | 0 | 0 | 0 |

In contrast, using a device according to the invention, such as a bar cam device, the power transfer rises rapidly to achieve 100% of the available power right near the top of the power curve, and follows the pressure curve down. The geometry of the rack assembly is such that power is transferred evenly by the entire longitudinal portion of the rack, and falls off only briefly while the pinion traverses the curved end portions. This hypothetical comparison illustrates one major advantage the invention holds over crankshafts: it is an extremely efficient power transfer device, and permits much more power to be developed by the same engine displacement as compared with conventional devices.

Similar efficiencies are apparent with compressors. The power transfer to the pistons is constant throughout the majority of the stroke where the pinion traverses the longitudinal portion of the rack, and falls off only at the ends of the stroke. The power output in terms of piston speed and pounds per square inch developed using a conventional crankshaft meets the pressure curve towards the middle of the stroke. The bar cam or similar application according to this invention, however, develops maximum piston speed and develops pressure much earlier in the stroke, and maintains it longer and at higher levels.

In applications where it is desirable to change the timing or to transfer less than 100% of the available power, the longitudinal portions of the engaging surface may be bowed or curved. Indeed, the engaging surface could be essentially circular, but would then provide less of a power output advantage as compared to a crankshaft. Accordingly, straight, longitudinal portions are generally preferred.

In embodiments of applicant's claimed invention, a pair of opposed pistons are connected directly to a toothed rack so as to form a unitary structure in which there is no relative motion in a lateral direction between the piston and toothed rack. Accordingly, there is no loss of power due to relative lateral motion such as occurs with a crankshaft. It is seen that the opposed pistons do not move closer to the rack over any portion of the cycle due to this direct connection.

By having the gear or pinion wheel in continuous engagement with the rack, power is continually being applied to the gear over the cycle so that there are no dwell times in which the gear is unpowered. This results in a very efficient, powerful engine in which engine efficiencies are drastically improved and smaller, lighter-weight engines can be utilized in lieu of larger, heavier engines for the same applications.

Moreover, in compressors, the inventive device increases valve life due to longer stroke, and therefore decreased valve movement. The device allows for oil free operation because there is no crank shaft and no impact from a connecting rod; and allows for fewer contaminates due to lack of oil. The device increases volume of compressor output by lengthening the piston travel without increasing the drive power required. It allows for engines, pumps, and compressors and the like to be made in one unit comprising one or more pairs of powering, or one or more pairs of cylinders compressing at the same time.

The device is advantageously used in piston and rotary pumps. In such applications, it allows for more stabilized pressure than crank shaft driven units because of fixed gear size and speed; allows for more continual torque because gear to rack distance remains constant or fixed; reduces horizontal movement; allows for use of multi-stage and different sized compressors or pumps; and allows for operation in either direction depending on timing.

A further advantage of the device is that it allows gear ratios to be changed while still using the same rack and housing; and a load can be applied in any direction while the rack travels in a lineal direction at any angle, including vertical and horizontal.

In conventional combustion engines, an oil reservoir holding several quarts of oil is required to lubricate the space between the connecting rod and crankshaft, so as to reduce impact friction during crank rotation. The oil, filter, and associated pumps must be replaced periodically. In two-stroke engines, the use of an oil reservoir has been eliminated by mixing oil with fuel so as to lubricate the crankcase during fuel intake. These engines emit extremely high levels of pollutants and are unsuitable for vehicles. This invention allows internal combustion engines to operate without crankcase lubrication, and therefore without any oil reservoir in the power transfer region. If self-lubricating or ceramic piston rings and cylinder sleeves are used, there is therefore essentially no need for extensive lubrication in the engine.

Likewise, the invention allows a compressor or pump to be operated without an oil reservoir around the connecting rod and crank shaft where the load is transmitted across a small turning surface. The environmental advantages of doing away with pressurized crankcase oil are apparent to anyone who disposes of used motor oil. There are also clear advantages to those who work near conventional compressors which tend to produce oil vapor in their exhaust. Such oil vapor is hazardous to workers and harmful to the environment, and can be easily eliminated without filters using the invention.

The invention allows for piston travel to be increased to virtually any desirable length in compressors and pumps. The floating shaft allows for a compact unit size and will still maintain a high output ratio. By using this arrangement it is possible to greatly reduce valve train wear by doubling or tripling the piston stroke length. The invention's compactness and small number of components makes it competitive with 4, 6, and 8 cylinder units that produce the same volume and pressure.

The invention reduces the amount of drive power required to produce the same specifications as larger units. This is accomplished by using fewer pistons, reducing the amount of surface area, and lengthening the piston travel. In sum, the advantages of the invention include the following:
1) cost effective use of fewer components
3) multi-cylinder capability
4) reduced valve train wear due to longer stroke
5) unlimited piston travel
6) simplicity of design
7) allows for smaller drive unit
8) capable of oil free operation.

EXAMPLES

As stated before, preferred applications of the device include a piston engine and a compressor. The compressor may also include first and second opposed pistons; cylinder means enclosing the face of each piston; gas within the cylinder means; and means for connecting the two pistons together with the rack assembly; such that rotation of the floating power transfer shaft results in linear reciprocation of the pistons along their strokes, and compresses the gases in the cylinders. A vacuum pump would work in essentially the same fashion.

A similar application is a liquid pump, in which liquids are present in the cylinder instead of gas. The compressor or pump is advantageous because the gas compressed by the pistons can be essentially free of lubricating oil, and may be used with any appropriate fluid, by which is meant a liquid or gas.

Other embodiments of the device include a bicycle. One pedal is linked directly to the rack assembly and pushes down when force is applied. The other is connected by a cable and pulley on the bicycle frame so that when force is applied downward on the pedal, it lifts the rack assembly up. The floating shaft is connected to a conventional bicycle drive sprocket and chain so that linear reciprocating motion of the pedals is converted to rotary motion of the sprocket and wheels.

The invention may also be used in a dual action logsplitter with an anvil and a wedge located at each end of the stroke of the reciprocating enclosed rack. Rotary motion is applied by an internal combustion engine or other input, and is gear reduced to working speeds, and interrupted by a clutch. In operation, reciprocating motion of the rack assembly provides means of applying compressive force first to one log placed between the anvil and wedge at one end of the path of reciprocation, then to a second log placed between the anvil and wedge at the other end of the path of reciprocation, such that logs may be split on both power strokes.

The device may also be used as a servo-device for hydraulic controls comprising a pedal to move the rack assembly to open or close a valve, for example, in helicopter controls which change the angle of the rotors.

In rotary actuator applications such as an air-driven motor, this mechanism overcomes the limited rotation of conventional actuators, which is one revolution per piston cycle. The invention permits multiple revolutions per cycle by means of gearing. This advantage is true of any embodiment of the invention, but is particularly desirable with small devices such as rotary actuators. The device will run continuously in either direction, and can be driven by any source of linear reciprocation, such as compressed gases, fluids or electromagnetic applications to generate rotational output.

In power or human-powered machines, bikes, airplanes, helicopters, boats, toys, and the like, a load is applied to the rack to produce a rotatable output, or input is applied to produce a reciprocal output, i.e. turn a propeller, impeller, or wheel, or to raise, lower, push or pull an object.

In valves for liquid, gas, or dry substances, the substance is delivered to the face of a piston area. As the piston is allowed to move down by rotating the floating shaft (for example by twisting a handle), the mass is allowed to exit the cylinder area by a series of openings in the sides of the cylinders. The advantage is that such a valve can not strip its thread and jam. The handle attached to the floating shaft can be rotated in one direction or the other, to pass top dead center. As in a transfer valve, this will synchronize the opening of one supply with the closing of the opposite supply. In this configuration, rotating the floating shaft in one direction or the other will open and then close the valve, and so on.

Similarly, in electric metering devices, the floating shaft can be rotated by a knob or handle in one direction or the other. This action then moves a rack assembly in a linear reciprocation, to vary the resistance down, then up, then down again.

In tracking devices the direction of linear reciprocation is oriented along the trajectory of a moving object, and the tracking device is pivotally mounted to the rack. A metered rotation is applied to move the rack assembly, thus tipping the tracker along the trajectory. Accordingly, the device is aligned with its target and follows the target's path by linear motion of the rack assembly.

In directional radar drives, which typically rotate rapidly and are subject to great stress, the device of the invention can be used to increase durability and efficiency. In such a device, linear reciprocation from conventional sources, such as steam from a ship's boiler or elsewhere, is converted into continuous rotary motion to rotate the radar module.

In electric motors the inventive power transfer device allows for the use of two or more small armatures to apply linear force, such as in an induction motor or as with a solenoid arrangement. The armatures may be round, or square in cross-section. The square shape increases the armature surface area and decreases the external diameter of the motor significantly. The armatures move in a reciprocating, linear motion. The amount of motion is determined by the length of the rack. Thermo-encased windings allow for super conducting capability in such an application.

Farm equipment can also benefit from the power transfer device disclosed and claimed herein. By synchronizing the rotation of the floating shaft with the travel of the equipment, a vertically-oriented rack can depress at a given interval, for example with seed planters.

In compacting equipment, a heavily weighted vertically aligned rack can be driven by rotation at high speeds so that on the downward stroke an impact is created, The rack assembly slides in the housing to create the impact.

A garage door opener can be built wherein the length of the oval rack surface is equal to the distance the door has to travel, and is supported as needed on a track mounted on the ceiling in the same manner as the door tracks. A one or two direction motor can be coupled to the input shaft. The door is only locked at the top and bottom position where the pinion is engaged with the end portions of the rack assembly, by the bar cam and the heavy gear ratio. If someone gets pinned by the door in a partially open position it can be pushed open simply by pushing the rack assembly along the straight position.

In robotics, oil in motors and compressors can be terribly detrimental. The device of the invention permits oil free operation. The rack assembly itself is used as the arm to be extended, and the power input is placed on a housing as shown above, e.g. FIG. 9. Rotation of the floating shaft can be by servo-motor or conventional means. In this fashion, the load can be applied in any direction by turning or tilting the housing, allowing the rack to travel in a lineal direction at a wide variety of degrees both horizontally and vertically.

In lifts, cylinders may be replaced by using one or more racks fastened together and powered by rotation. One rack can be used for example in a dump truck. Two or more racks may be set back to back with an idler gear between them. The thrust assembly is supported at the middle of the oval rack, for example as in FIG. 11. The first rack is affixed to the base of the lift and the second rack is affixed to the moving portion at the top of the lift to provide the necessary force.

The device can be used as an efficient power transfer mechanism in sabre saws and the like. The motor force is applied to the rotating shaft and the blade is coupled to one or both ends of the reciprocating rack to provide the needed movement. In such applications and others, the stroke can by varied by changing the rack length.

In another example of the invention's application, mixing equipment is constructed with a motor coupled to a floating shaft. The rack ends are affixed with hinges and pivoted to paddles, so that as the rack moves back and forth, so do the paddles. The hinges allow for reciprocation to change the angles of the paddles by lever action. The rack may be lengthened to any distance and the drive motor requirements will remain the same.

Other embodiments of the invention include wave power generators. Here, a collector pipe face the surf. As the water enters the pipes it compresses the air within the collector pipe, which drives a piston back and forth. This is converted by the power transfer device to create rotary motion to drive a generator or the like. The rack length can be adjusted to time the cycles of the waves.

Wind-powered pumps are another useful application. For example, the wind turns a blade, and this rotation is then transmitted down to an input shaft of the mechanism to move the rack, and thereby to operate pistons. The rack may be lengthened to move more volume of liquid without increasing the load on the wind blades or vanes.

From the foregoing description, one skilled in the art can make various changes, modifications, and adaptations of the embodiment to employ the invention as needed.

I claim:

1. A device for transferring power between rotary and reciprocating motion comprising:

(a) a rack assembly comprising opposed, spaced apart longitudinal portions joined by curved end portions, arrayed to form a substantially continuous engaging surface;
   (b) a stator block slidably supporting the rack assembly in reciprocating linear movement;
   (c) a pinion wheel;
   (d) a guide cam; and
   (e) an integral floating power transfer shaft restrainedly guided by the guide cam to hold the pinion wheel in continuous engagement with the engaging surface of the rack assembly, said integral floating shaft being directly connected with the pinion and mounted to swing in an arc essentially perpendicular to the linear motion of the rack assembly;

such that linear reciprocation of the rack assembly through the stator block is coupled with rotary motion of the power transfer shaft and periodic rocking of the shaft as the pinion wheel traverses the engaging surface of the rack.

2. The device of claim 1 further comprising a drive shaft that rotates around a fixed axis, coupled to the floating power transfer shaft.

3. The device of claim 2 wherein the coupling means is a constant velocity joint.

4. The device of claim 2 wherein the floating power transfer shaft is oriented perpendicular to the drive shaft, and the coupling means comprises a conical gear on the drive shaft meshing with a conical gear on the floating power shaft.

5. The device of claim 1 wherein the engaging surface is toothed and is internal to the rack assembly.

6. The device of claim 1 wherein the engaging surface is a friction surface.

7. The device of claim 1 wherein the longitudinal portions of the enclosed rack are parallel to each other.

8. The device of claim 1 further comprising a flywheel and coupling means for transferring the rotary motion of the power transfer shaft to the flywheel.

9. The device of claim 1 wherein the angle described by the arc of the floating power transfer shaft is between approximately 15 and approximately 45 degrees.

10. The device of claim 1 wherein the device is composed of materials that do not require external lubrication.

11. The device of claim 1 wherein linear reciprocating power input is transferred to rotary power output by applying a linear force to the rack so that it reciprocatingly slides through the stator block, thus causing the pinion to traverse the engaging surface of the rack and to rotate the floating shaft.

12. A piston engine comprising the device of claim 11.

13. The device of claim 1 wherein rotary power input is transferred to reciprocating linear power output.

14. A compressor comprising the device of claim 13.

15. A compressor comprising the device of claim 13 further comprising a piston; a cylinder enclosing the face of the piston and connected to the rack assembly; and gas within the cylinder; such that rotation of the floating power transfer shaft results in linear reciprocation of the piston along its stroke, and compresses the gas in the cylinder.

16. A device according to claim 1 ganging multiple pairs of cylinders to one output or input.

17. The compressor of claim 16, wherein the fluid compressed by the pistons is essentially free of lubricating oil.

18. A pump comprising the device of claim 1, wherein rotation of the floating shaft displaces a fluid from the cylinders.

19. A bicycle comprising the device of claim 1, such that linear motion of the pedals is converted to rotary motion of the drive wheel.

20. A dual action log-splitter comprising the device of claim 1, with an anvil and a wedge located at each end of the stroke of the reciprocating enclosed rack, wherein the reciprocating motion of the enclosed rack provides means of applying compressive force first to one log placed between the anvil and wedge at one end of the path of reciprocation, then to a second log placed between the anvil and wedge at the other end of the path of reciprocation, such that logs may be split on both power strokes.

21. A garage door opener comprising the device of claim 1.

22. A robotic arm comprising the device of claim 1.

23. A lift comprising the device of claim 1.

24. A reciprocating saw comprising the device of claim 1.

25. An electric motor comprising the device of claim 1 and converting linear into rotary motion.

26. A radar drive comprising the device of claim 1.

27. The device of claim 1 in which there are two longitudinal portions joined by two curved end portions substantially symmetrical to each other.

28. A device for transferring power between rotary and reciprocating motion comprising:
  (a) a rack assembly comprising opposed, spaced apart longitudinal portions joined by curved end portions, arrayed to form a substantially continuous engaging surface;
  (b) a stator block slidably supporting the rack assembly in reciprocating linear movement;
  (c) a pinion wheel;
  (d) a guide cam comprising a bar cam with external surfaces paralleling the internal surfaces of the rack, two end channels, and, connected to the pinion wheel, stabilizer bushing means for traversing the external bar cam surfaces and channels to hold the pinion in continuous engagement with the enclosed rack; and
  (e) a floating power transfer shaft restrainedly guided by the guide cam to hold the pinion wheel in continuous engagement with the engaging surface of the rack assembly, said floating shaft being connected with the pinion and mounted to swing in an arc essentially perpendicular to the linear motion of the rack assembly; such that linear reciprocation of the rack assembly through the stator block is coupled with rotary motion of the power transfer shaft and periodic rocking of the shaft as the pinion wheel traverses the engaging surface of the rack.

29. A device for transferring power between rotary and reciprocating motion comprising:
  (a) a rack assembly comprising opposed, spaced apart longitudinal portions joined by curved end portions, arrayed to form a substantially continuous toothed engaging surface internal to the rack assembly; wherein the longitudinal portions of the enclosed rack are straight and parallel to each other and the longitudinal and end portions of the rack have first, second, and third helical gear sections of differing tooth configurations positioned in a repetitive ordered array on the surface of the rack, the first section having teeth oriented to extend at a positive angle with respect to the direction of linear motion, the second section having teeth oriented to extend perpendicular to the direction of linear motion, and the third section having teeth oriented to extend at a negative angle with respect to the direction of linear motion; and the pinion gear has a surface with first, second, and third sections complementing the first, second, and third sections of the rack;
  (b) a stator block slidably supporting the rack assembly in reciprocating linear movement;
  (c) a pinion wheel;
  (d) a guide cam: and
  (e) a floating power transfer shaft restrainedly guided by the guide cam to hold the pinion wheel in continuous engagement with the engaging surface of the rack assembly, said floating shaft being connected with the pinion and mounted to swing in an arc essentially perpendicular to the linear motion of the rack assembly; such that linear reciprocation of the rack assembly through the stator block is coupled with rotary motion of the power transfer shaft and periodic rocking of the shaft as the pinion wheel traverses the engaging surface of the rack.

* * * * *